June 28, 1932.  A. SCHALLER  1,864,861
HOSE COUPLING
Filed June 5, 1928
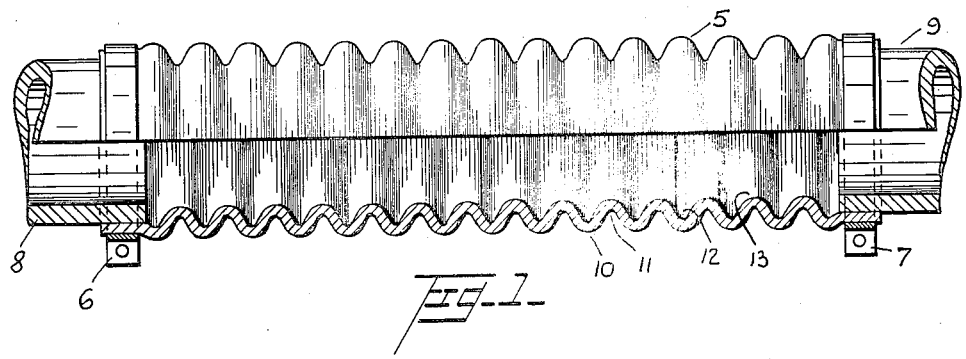
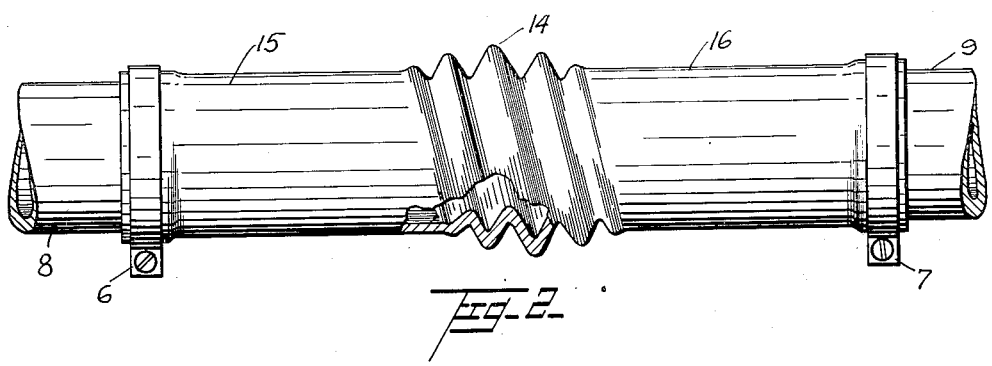
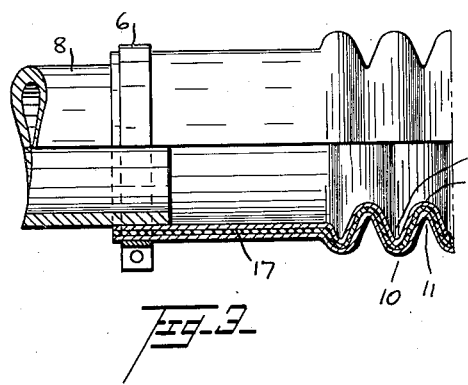 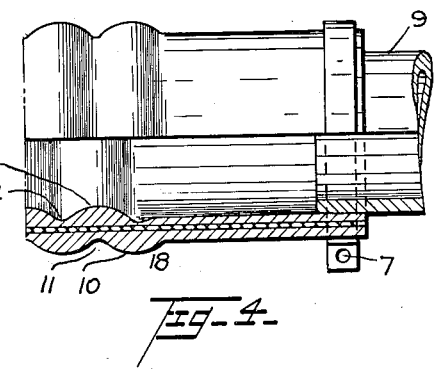
INVENTOR.
Alfred Schaller
BY
ATTORNEY.

Patented June 28, 1932

1,864,861

UNITED STATES PATENT OFFICE

ALFRED SCHALLER, OF NEW YORK, N. Y.

HOSE COUPLING

Application filed June 5, 1928. Serial No. 282,975.

Hose couplings are very frequently used and convenient means of connection for conducting gases or liquids between appliances which do not always retain the same position in relation to each other and which often have to be disconnected from each other. In innumerable modern machines such couplings represent a standard accessory which in the layout is, as a matter of routine, slipped in between parts movable in relation to each other. It therefore happens frequently that very little attention is given to the proper construction and functioning of and the ready access to such couplings. I have particular reference to the hose couplings used in practically all vehicles, which derive their motive power from an internal combustion engine, for connecting the water jackets on the engine to the radiator mounted on the chassis. Such hose couplings are usually located in a place which is hard to reach and in addition the outlets and inlets to be connected by such a coupling are so close to each other that there is ordinarily no room for the manipulation of the hose coupling in slipping it onto those openings. These couplings are usually made out of an elastic tubing which, however, in the direction of its axis, allows very little compression, at least not so much that, after one end of the coupling is slipped over one of the openings to be connected by it, it can be pressed together so much that the other end of the coupling could be slipped onto the other opening in the direction of the axis.

In view of these disadvantages experienced today in the use of hose couplings, I have developed my improvements set forth in the following, the objects of which are:

1.—A coaxially collapsing hose coupling.

2.—A coupling which may be conveniently gripped for the purpose of slipping it onto and off the openings to be connected.

3.—A hose coupling which, when bent, does not collapse in a direction at right angles to its axis.

I attain these objects by the improvements illustrated in the accompanying drawing in which Figure 1, shows a partly sectioned view of my improvement slipped upon and clamped onto the ends of the inlet and outlet to be connected by it.

Fig. 2 is a similar partly sectioned view of a different execution of my invention.

Figs. 3 and 4 show partly sectioned halves of my improved coupling illustrating various modifications of the structure of the walls of the hose.

In Fig. 1 the hose 5 is fastened by the clamps 6 and 7 upon the inlet 8 and outlet 9. My improvement is shown here as a section of a hose, the wall of which has a continuity of corrugations in which the ridges 10 and grooves 11 on the outside correspond to grooves 12 and ridges 13 on the inside of the hose. The hose is cut at the ends at points of largest diameter in the grooves on the inside of the hose. These diameters are the same or slightly larger than the outside diameters of inlet 8 and outlet 9, so that the two ends of the hose can readily be set upon the ends of said openings and the adjoining ridges on the inside of the hose may then be pushed over the openings offering a tensional grip upon the outsides of the inlet and the outlet owing to the elastic property of the hose. The hose is held in position by the clamps 6 and 7 after it thus has been slipped upon the inlet and the outlet.

In Fig. 2 the spiral corrugation 14, consisting of only a few turns which disappear in the straight ends 15 and 16 of the hose, takes the place of the continuity of parallel corrugations in Fig. 1.

My hose coupling may consist of solid rubber or it may be built up on a fabric structure of the kind usually employed for such couplings. The method of letting such a fabric structure 17 follow the convolutions of the hose, by embedding it in the center of the uniform thickness of the wall of such a hose,—and the method of building up the corrugations on a straight, cylindrical fabric sleeve 18, are respectively illustrated in Figs. 3 and 4. Just a few corrugations, essentially normal to the coupling, as indicated in these two figures, are sufficient to lend to my improvement the desired properties which make its use so advantageous; but the manufacturing methods used today may adapt themselves more readily to a hose with a continuity of corrugations as shown in Fig. 1.

Hose of the kind used today for couplings is usually exposed to bending strains in one particular direction owing to which the hose collapses in a direction perpendicular to its axis, decreasing thereby the cross section on the inside of the hose for the passage of the gas or liquid and sharply creasing the tube at certain points in which it cracks sooner or later. That will not happen with my improved couplings in which the corrugations allow sufficient play, when bent as well as when compressed, to permit any kind of collapsing in a direction normal to the axis of the hose, yet facilitating collapsing in the direction of the axis. Due to that coaxial collapsing, the overall length of my hose coupling may be shortened by compression so much as to allow it without substantial bending to be slipped in between the inlet and the outlet and when released the ends of my coupling will slip over these openings. If heretofore the operation of inserting the hose coupling required many minutes of exasperating manipulations on the part of the mechanic, the period of time required for attaching my improvement between the openings to be connected is reduced to just as many seconds.

It is evident that the depth of the grooves compared with the uniform thickness of the wall of my hose coupling governs the extent of coaxial collapsibility. If the normal pitch distance between the centers of adjacent ridges and grooves exceeds the thickness of the wall of the hose I attain the extreme coaxial collapsibility which is however not always necessary but I may provide less pronounced undulations in the wall which become sharper, when the coupling is compressed. Generally speaking the pitch of the corrugations is governed by the number of corrugations used in a certain coupling, the total length of the coupling, and the thickness of the wall of the hose.

I claim:

1. A hose connection made up of an elastic wall comprising an intermediate portion formed of a plurality of continuous corrugations arranged in the form of a double cone helix, the largest outside diameter of said convolutions being substantially at the center of said connection.

2. A hose connection made up of an elastic wall comprising an intermediate portion formed of a plurality of continuous corrugations arranged in the form of a double cone helix, the largest outside and the smallest inside diameter of said convolutions being substantially at the center of said connection.

Signed at New York in the county and State of New York this 4th day of June A. D. 1928.

ALFRED SCHALLER.